(12) United States Patent
Han et al.

(10) Patent No.: US 11,031,652 B2
(45) Date of Patent: Jun. 8, 2021

(54) BATTERY AND MOBILE TERMINAL

(71) Applicant: Huawei Technologies Co., Ltd., Shenzhen (CN)

(72) Inventors: Junjie Han, Beijing (CN); Jiong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 16/328,124

(22) PCT Filed: Mar. 29, 2017

(86) PCT No.: PCT/CN2017/078649
§ 371 (c)(1),
(2) Date: Feb. 25, 2019

(87) PCT Pub. No.: WO2018/126544
PCT Pub. Date: Jul. 12, 2018

(65) Prior Publication Data
US 2019/0189983 A1    Jun. 20, 2019

(30) Foreign Application Priority Data

Jan. 5, 2017 (CN) .......................... 201710007444.1

(51) Int. Cl.
*H01M 2/10* (2006.01)
*H01M 2/02* (2006.01)
(Continued)

(52) U.S. Cl.
CPC ........ *H01M 50/209* (2021.01); *G06F 1/1635* (2013.01); *H01M 50/10* (2021.01);
(Continued)

(58) Field of Classification Search
CPC .... H01M 2/1066; H01M 2/0267; H01M 2/30; H01M 2/0207; H01M 2/1094; G06F 1/1635; H04M 1/02; H04M 1/0262
See application file for complete search history.

(56) References Cited

U.S. PATENT DOCUMENTS

D598,785 S  *  8/2009  Stojek ............................ D9/732
D798,739 S  *  10/2017 Reaux ............................ D9/756
(Continued)

FOREIGN PATENT DOCUMENTS

CN      103390732 A    11/2013
CN      203674318 U     6/2014
(Continued)

OTHER PUBLICATIONS

Machine Translation and Abstract of Chinese Publication No. CN106299186, Jan. 4, 2017, 15 pages.
(Continued)

*Primary Examiner* — Muhammad S Siddiquee
(74) *Attorney, Agent, or Firm* — Conley Rose, P.C.

(57) ABSTRACT

A battery and a mobile terminal relate to the field of terminal technologies, where the battery is securely bonded inside a rear housing. The battery includes a battery body and a package case. The battery body is accommodated inside the package case. The package case includes a first surface and a second surface opposite to the first surface. The first surface and the rear housing are attached and secured. The second surface has a tear structure. The package case is configured to torn open by tearing the tear structure to remove the battery body. In this way, when the battery is removed from the rear housing, the tear structure may be torn to remove the battery, thereby preventing deformations, wrinkles, or bulges in an aluminum plastic film on the battery.

20 Claims, 4 Drawing Sheets

(51) Int. Cl.
*H01M 2/30* (2006.01)
*H04M 1/02* (2006.01)
*G06F 1/16* (2006.01)
*H01M 50/209* (2021.01)
*H01M 50/10* (2021.01)
*H01M 50/24* (2021.01)
*H01M 50/116* (2021.01)
*H01M 50/543* (2021.01)

(52) U.S. Cl.
CPC ......... *H01M 50/116* (2021.01); *H01M 50/24* (2021.01); *H01M 50/543* (2021.01); *H04M 1/02* (2013.01); *H04M 1/0262* (2013.01)

(56) References Cited

U.S. PATENT DOCUMENTS

| | | | |
|---|---|---|---|
| 2005/0079412 A1 | 4/2005 | Kim | |
| 2005/0284789 A1* | 12/2005 | Carespodi | B32B 15/09 206/461 |
| 2015/0228944 A1* | 8/2015 | Lin | G06F 1/1635 429/100 |

FOREIGN PATENT DOCUMENTS

| | | |
|---|---|---|
| CN | 104576990 A | 4/2015 |
| CN | 105514316 A | 4/2016 |
| CN | 205609636 U | 9/2016 |
| CN | 106299165 A | 1/2017 |
| CN | 106299186 A | 1/2017 |
| JP | H10297626 A | 11/1998 |
| JP | 2000123805 A | 4/2000 |
| JP | 2000228174 A | 8/2000 |
| JP | 2002042781 A | 2/2002 |
| JP | 2005011816 A | 1/2005 |
| JP | 4064000 B2 | 3/2008 |
| WO | 2015182050 A1 | 12/2015 |

OTHER PUBLICATIONS

Machine Translation and Abstract of Chinese Publication No. CN205609636, Sep. 28, 2016, 10 pages.
Machine Translation and Abstract of Japanese Publication No. JP4064000, Mar. 19, 2008, 22 pages.
Machine Translation and Abstract of International Publication No. WO2015182050, Dec. 3, 2015, 41 pages.
Foreign Communication From a Counterpart Application, PCT Application No. PCT/CN2017/078649, International Search Report dated Oct. 11, 2017, 2 pages.
Machine Translation and Abstract of Chinese Publication No. CN203674318, Jun. 25, 2014, 5 pages.
Machine Translation and Abstract of Chinese Publication No. CN104576990, Apr. 29, 2015, 14 pages.
Machine Translation and Abstract of Japanese Publication No. JP2000123805, Apr. 28, 2000, 9 pages.
Machine Translation and Abstract of Japanese Publication No. JP2000228174, Aug. 15, 2000, 26 pages.
Machine Translation and Abstract of Japanese Publication No. JPH10297626, Nov. 10, 1998, 15 pages.
Foreign Communication From a Counterpart Application, Japanese Application No. 2019-513100, Japanese Office Action dated Dec. 3, 2019, 4 pages.
Foreign Communication From a Counterpart Application, Japanese Application No. 2019-513100, English Translation of Japanese Office Action dated Dec. 3, 2019, 4 pages.
Machine Translation and Abstract of Chinese Publication No. CN106299165, Jan. 4, 2017, 14 pages.
Foreign Communication From a Counterpart Application, Chinese Application No. 201780009682.4, Chinese Office Action dated Oct. 22, 2019, 7 pages.

* cited by examiner ns, and the
BATTERY AND MOBILE TERMINAL

CROSS-REFERENCE TO RELATED APPLICATIONS

This application is a U.S. National Stage of International Patent Application No. PCT/CN2017/078649 filed on Mar. 29, 2017, which claims priority to Chinese Patent Application No. 201710007444.1 filed on Jan. 5, 2017. Both of the aforementioned applications are hereby incorporated by reference in their entireties.

This application relates to the field of terminal technologies, and in particular, to a battery and a mobile terminal.

BACKGROUND

A battery in a mobile terminal such as a mobile phone or a pad has a relatively high value. However, at present, a built-in design is used for batteries in basically all mobile terminals. That is, a battery that is not packaged in a plastic case is securely bonded inside a rear housing of a mobile terminal by directly using an adhesive. In this way, when the battery is removed from the rear housing, because the adhesive has relatively high bonding strength, different degrees of deformations or wrinkles or bulges in an aluminum plastic film appear easily on a surface, bonded to the rear housing, of the battery, resulting in that the battery is scrapped and cannot be reused.

SUMMARY

Embodiments of this application provide a battery and a mobile terminal including the battery, so that deformations or wrinkles or bulges in an aluminum plastic film can be prevented when a battery built in a mobile terminal is removed from a rear housing, thereby reducing costs of decomposing or scrapping a built-in battery and making a battery in a mobile terminal reusable.

To achieve the foregoing objective, the following technical solutions are used in the embodiments of this application.

According to a first aspect, this application provides a battery. The battery is securely bonded inside a rear housing of a mobile terminal. The battery includes a battery body and a package case. The battery body is accommodated inside the package case. The package case includes a first surface and a second surface opposite to the first surface. The first surface and the rear housing are attached and secured. The second surface has a tear structure. The package case can be torn open by tearing the tear structure to remove the battery body.

After the battery provided in this embodiment of this application is accommodated inside the package case, the package case may be securely bonded inside the rear housing. When the battery needs to be removed from the rear housing, the battery body accommodated inside the package case is removable by merely tearing open the package case by tearing the tear structure, to prevent deformations or wrinkles or bulges in an aluminum plastic film when the battery body is removed, thereby reducing costs of decomposing and scrapping the battery and making the battery reusable. The package case may be a rigid housing or may be a flexible thin-film case.

Optionally, the package case is a packaging film covering the battery body. The packaging film has advantages such as a light weight and a small thickness, so that impact of the package case on the thickness and weight of the battery can be reduced.

Optionally, the tear structure is a first tear line, and the second surface of the package case can be torn open along the first tear line. In this way, the battery body is removable by merely manually tearing open the entire second surface of the package case along the first tear line.

Optionally, the first tear line is located in a central region of the second surface of the package case. In this way, the first tear line has approximately equal distances from a periphery of the second surface of the package case, making it convenient to tear open the entire second surface of the package case along the first tear line in a circumferential direction.

Optionally, the first tear line includes a first sub-tear line and a second sub-tear line, the first sub-tear line forms a first tear opening, and the first sub-tear line extends outward from the first tear opening to form the second sub-tear line. In this way, when the battery is removed from the rear housing of the mobile terminal, the first tear opening may be first torn open along the first sub-tear line, so that an edge of the packaging film is exposed at the first tear opening. The edge of the packaging film at the first tear opening is then scraped, and the edge of the packaging film is drawn to move outward from the first tear opening to tear open the second surface of the package case. This process is simple and facilitates a manual tear operation.

Optionally, there are a plurality of second sub-tear lines, and the plurality of second sub-tear lines are disposed evenly around the first tear opening. In this way, the entire second surface of the package case can be torn open from a circumference of the first tear opening along the plurality of second sub-tear lines, thereby reducing difficulty of tearing open the package case.

Optionally, a region enclosed by the first sub-tear line is rectangular, there are four second sub-tear lines, the four second sub-tear lines respectively extend outward from four corners of the first sub-tear line, and angles between each second sub-tear line and two sides of the first sub-tear line that form each corner are both greater than 90°. In this way, after the first tear opening is torn open along the first sub-tear line, in the process of pulling the edge of the packaging film at the first tear opening to move outward from the first tear opening, a pulling force may be concentrated at four corners of the first sub-tear line, making it convenient to tear open the entire second surface of the package case along the second sub-tear lines, thereby reducing difficulty of tearing open the package case.

Optionally, a second tear line is further disposed on the packaging film, the second tear line forms a second tear opening, the second tear opening is aligned with positive and negative electrodes on the battery body. Therefore, before the positive and negative electrodes of the battery body are connected to a control board in the mobile terminal, the second tear opening can be torn open along the second tear line to expose the positive and negative electrodes of the battery body, to facilitate a connection between the battery body and the control board of the mobile terminal.

Optionally, an opening is disposed in a position, corresponding to the positive and negative electrodes of the battery body, of the package case. This opening may be used to expose the positive and negative electrodes of the battery body, to facilitate a connection between the battery body and the control board of the mobile terminal.

Optionally, a wall thickness of the package case is less than 0.08 millimeter. This can prevent the wall thickness of the package case from becoming relatively large to cause relatively large thickness of the battery, to facilitate implementation of a thin design of the battery, thereby further facilitating implementation of a thin design of the mobile terminal.

Optionally, the battery body is packaged with the packaging film by using a plastic packaging apparatus. The plastic packaging apparatus is used to package an electromagnetic body with the packaging film, to implement an automated operation, thereby saving formation time of a plastic packaging case and improving formation efficiency.

Optionally, an operating temperature used to package the battery body by using the plastic packaging apparatus is less than 80° C., to prevent the temperature used to package the battery body with the packaging film from exceeding a bearing limit of the battery body to damage the battery body.

Optionally, a material of the packaging film is polyethylene. The polyethylene has better shrinkage performance during plastic packaging, making it convenient to tightly attach the packaging film to a surface of the battery body.

According to a second aspect, this application provides a mobile terminal, including a rear housing and the battery in any optional solution in the foregoing. The rear housing includes a bottom panel and a side panel disposed on a periphery of the bottom panel. An accommodating groove is enclosed by the bottom panel and the side panel. The battery is securely bonded inside the accommodating groove.

In the mobile terminal provided in this embodiment of this application, after the battery body is accommodated inside the package case, the package case may be securely bonded inside the accommodating groove formed by the rear housing. When the battery needs to be removed from the accommodating groove, the battery body accommodated inside the package case is removable by merely tearing open the package case by tearing the tear structure, to prevent deformations or wrinkles or bulges in an aluminum plastic film when the battery body is removed, thereby reducing costs of decomposing and scrapping the battery and making the battery reusable. The package case may be a rigid housing or may be a flexible thin-film case.

BRIEF DESCRIPTION OF DRAWINGS

The following briefly describes the accompanying drawings required for describing the embodiments or the prior art.

DESCRIPTION OF EMBODIMENTS

The following describes the technical solutions in the embodiments of this application with reference to the accompanying drawings in the embodiments of this application.

In the descriptions of this application, directions or position relationships indicated by the terms "center", "up", "down", "front", "rear", "left", "right", "vertical", "horizontal", "top", "bottom", "inside", "outside", and the like are based on the directions or position relationships shown in the accompanying drawings, and are merely intended to describe this application and simplify the descriptions, but are not intended to indicate or imply that an apparatus or a component shall have a specific direction or be formed and operated in a specific direction, and therefore shall not be understood as a limitation on this application.

In the descriptions of this application, it should be noted that, unless otherwise specified and limited explicitly, the terms "mounting", "connected", and "connection" shall be understood in a general manner, for example, may be a fixed connection, a detachable connection, or an integrated connection; and persons of ordinary skill in the art may understand specific meanings of the terms in this application according to specific situations.

Figure 1:
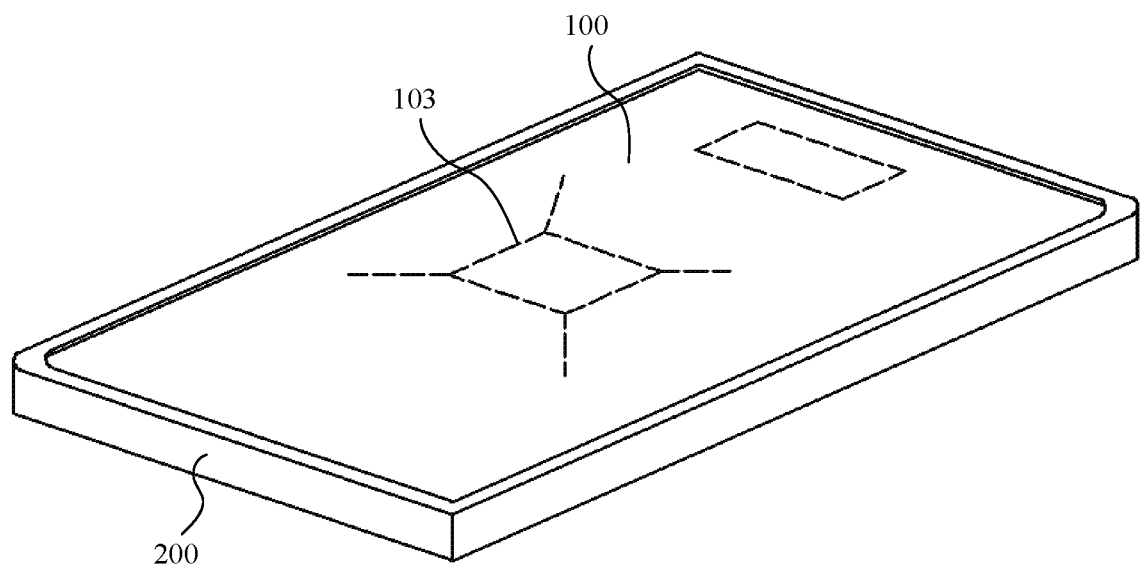
FIG. 1 is a schematic structural diagram of a mobile terminal according to an embodiment of this application.
Figure 2:
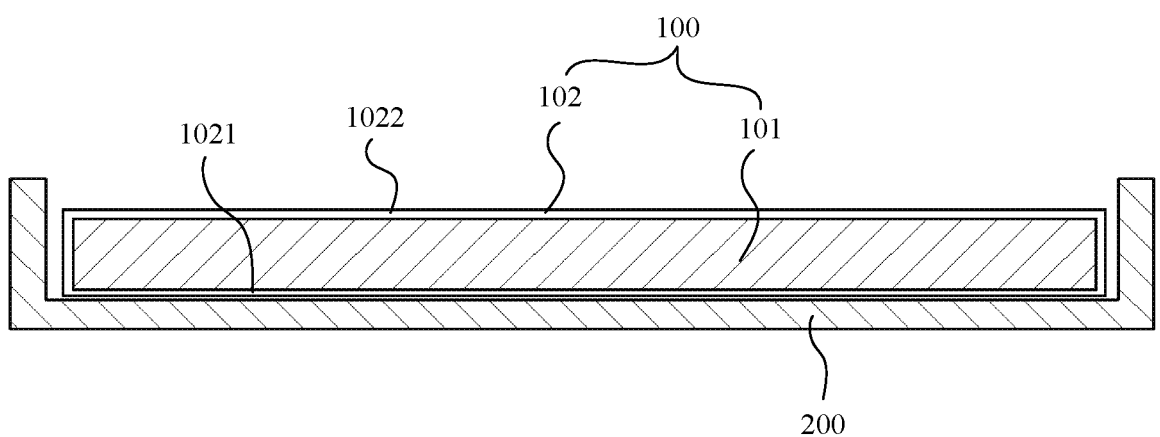
FIG. 2 is a schematic structural sectional view of the mobile terminal shown in FIG. 1.
Figure 3:
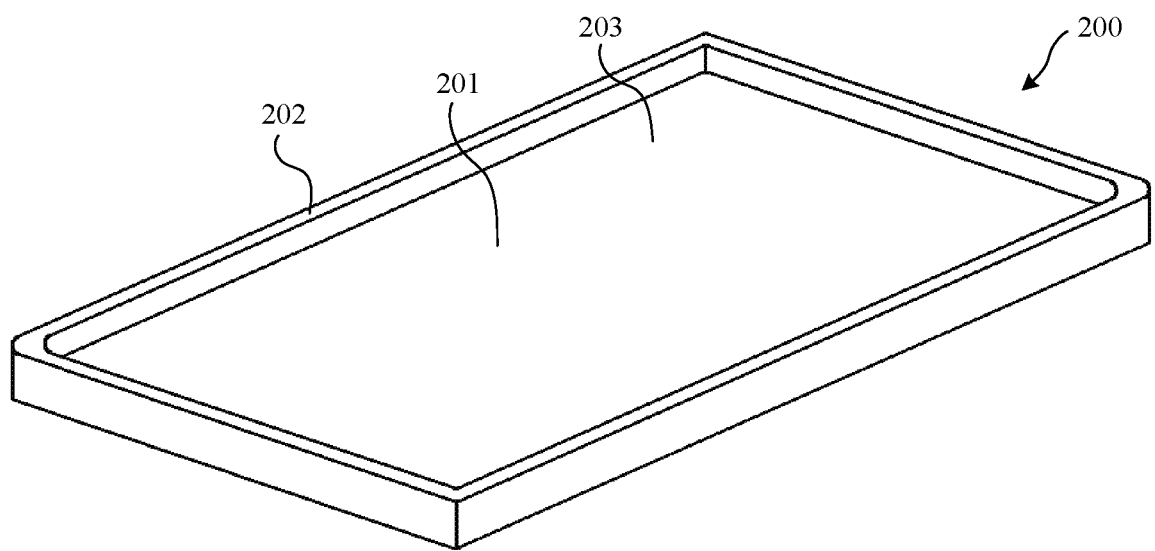
FIG. 3 is a schematic structural diagram of a rear housing in a mobile terminal according to an embodiment of this application.
Figure 4:
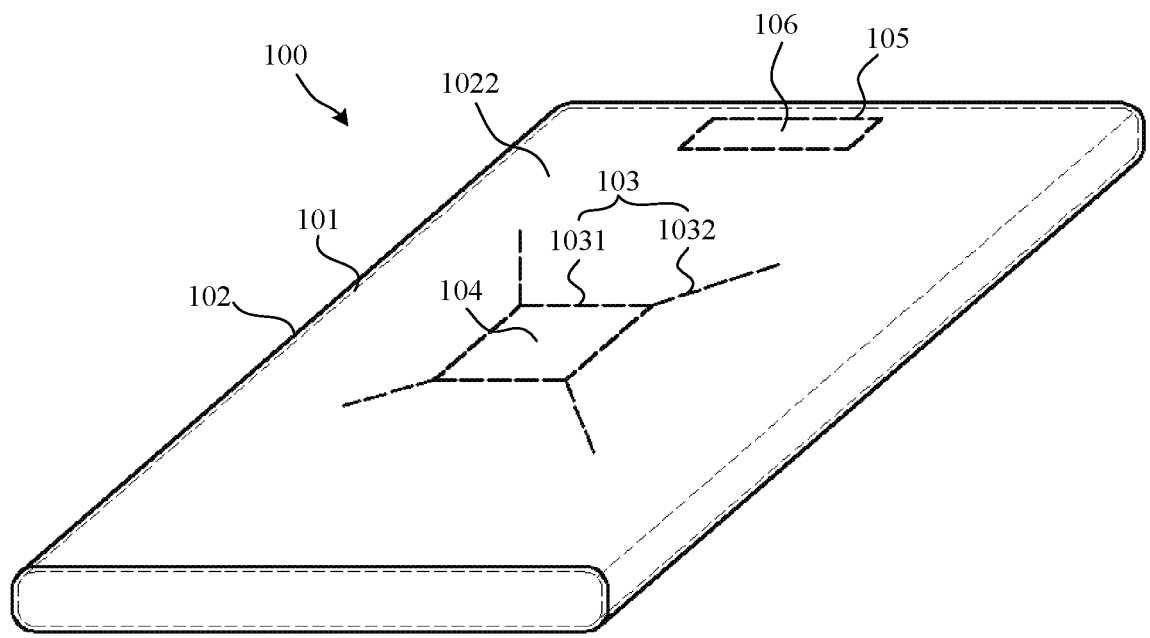
FIG. 4 is a first schematic structural diagram of a battery in a mobile terminal according to an embodiment of this application.

Referring to FIG. 1 and FIG. 2, FIG. 1 and FIG. 2 show a specific embodiment of a mobile terminal according to an embodiment of this application. The mobile terminal in this embodiment includes a rear housing 200 and a battery 100. The battery 100 is securely bonded inside the rear housing. A structure of the rear housing 200 is shown in FIG. 3. Referring to FIG. 3, the rear housing 200 includes a bottom panel 201 and a side panel 202 disposed on a periphery of the bottom panel 201. An accommodating groove 203 is enclosed by the bottom panel 201 and the side panel 202. In addition, a structure of the battery 100 is shown in FIG. 4. Referring to FIG. 4, the battery 100 is securely bonded inside the accommodating groove 203 of the rear housing. The battery 100 includes a battery body 101 and a package case 102. The battery body 101 is accommodated inside the package case 102. The package case 102 includes a first surface 1021 and a second surface 1022 opposite to the first surface 1021. The first surface 1021 and the bottom panel 201 are attached and secured. The second surface 1022 has a tear structure 103. The package case 102 can be torn open by tearing the tear structure 103 to remove the battery body 101.

In the mobile terminal provided in this embodiment of this application, after the battery body 101 is accommodated inside the package case 102, the package case 102 may be securely bonded inside the accommodating groove 203 formed by the rear housing 200. When the battery 100 needs to be removed, the battery body 101 accommodated inside the package case 102 is removable by merely tearing open the package case 102 by tearing the tear structure 103, to prevent deformations or wrinkles or bulges in an aluminum plastic film in the process of removing the battery body 101, thereby reducing costs of decomposing and scrapping the battery 100 and making the battery 100 reusable.

In the foregoing embodiment, it should be noted that the battery body 101 is only accommodated inside the package case 102, and no connection relationship exists between the battery body 101 and the package case 102. In this way, when the package case is torn open to remove the battery, the original state of the battery can be kept, and deformations or wrinkles or bulges in an aluminum plastic film do not occur.

The battery 100 may be bonded inside the accommodating groove 203 by using an adhesive, or may be bonded inside the accommodating groove 203 by using a stretch release tape. This is not specifically limited herein.

In addition, the package case 102 may be bonded to the bottom panel 201 of the rear housing 200 by using only the first surface 1021, or may be bonded to the side panel 202 by using only a surface adjacent to the first surface 1021, or may further be bonded to the bottom panel 201 of the rear housing 200 by using the first surface 1021 and at the same time bonded to the side panel 202 by using the surface of the first surface 1021. This is not specifically limited herein.

Moreover, the package case 102 may be a rigid housing or may be a flexible thin-film case. This is not specifically limited herein.

Optionally, the package case 102 is a packaging film covering the battery body 101. The plastic packaging film has a light weight and a small thickness, so that impact of the package case 102 on the thickness and weight of the battery can be reduced. Moreover, because of the light weight and small thickness of the packaging film, it is convenient to tear open the packaging film by tearing the tear structure 103.

In the foregoing embodiment, the packaging film may be a plastic film, a rubber film, or the like. This is not specifically limited herein. The packaging film may cover the battery body 101 by using manual operations, or may cover the battery body 101 by using mechanical equipment. This is not specifically limited herein.

Optionally, referring to FIG. 4, the tear structure 103 is a first tear line, and the second surface 1022 of the package case 102 can be torn open along the first tear line. In this way, the battery body 101 is removable by merely manually tearing open the second surface 1022 of the package case 102 along the first tear line.

In the foregoing embodiment, the first tear line may extend along a straight line or may extend along a curve. This is not specifically limited herein. Moreover, the first tear line may include one tear line or may include a plurality of tear lines. This is not specifically limited herein. When the first tear line includes a plurality of tear lines, the plurality of tear lines may be disposed parallel to each other, or may be disposed intersecting each other. This is not specifically herein.

The first tear line may be located in a central region of the second surface 1022 of the package case 102, or may be located at an edge position of the second surface 1022 of the package case 102. This is not specifically limited herein.

Optionally, referring to FIG. 4, the first tear line is located in a central region of the second surface 1022 of the package case 102. In this way, the first tear line has approximately equal distances from a periphery of the second surface 1022 of the package case 102, making it convenient to tear open the second surface 1022 of the package case 102 along the first tear line in a circumferential direction.

Optionally, referring to FIG. 4, the first tear line includes a first sub-tear line 1031 and a second sub-tear line 1032. The first sub-tear line 1031 forms a first tear opening 104. The first sub-tear line 1031 extends outward from the first tear opening 104 to form the second sub-tear line 1032. In this way, when the battery is removed from the rear housing of the mobile terminal, the first tear opening 104 may be first torn open along the first sub-tear line 1031, so that an edge of the packaging film is exposed at the first tear opening 104. The edge of the packaging film at the first tear opening 104 is then scraped, and the edge of the packaging film is drawn to move outward from the first tear opening 104 to tear open the second surface 1022 of the package case 102. This process is simple and facilitates a manual tear operation.

In the foregoing embodiment, the first tear opening 104 enclosed by the first sub-tear line 1031 may have a square shape, an oblong shape, a circular shape, or the like. This is not specifically limited herein. Moreover, there may be one second sub-tear line 1032, or there may be a plurality of second sub-tear lines 1032. This is not specifically limited herein.

Optionally, there are a plurality of second sub-tear lines 1032. The plurality of second sub-tear lines 1032 are disposed evenly around the first tear opening 104. In this way, the second surface 1022 of the package case 102 can be torn open from a circumference of the first tear opening 104 along the plurality of second sub-tear lines 1032, thereby reducing difficulty of tearing open the package case 102.

There may be two, three, four, or another quantity of second sub-tear lines 1032. This is not specifically limited herein.

Figure 5:
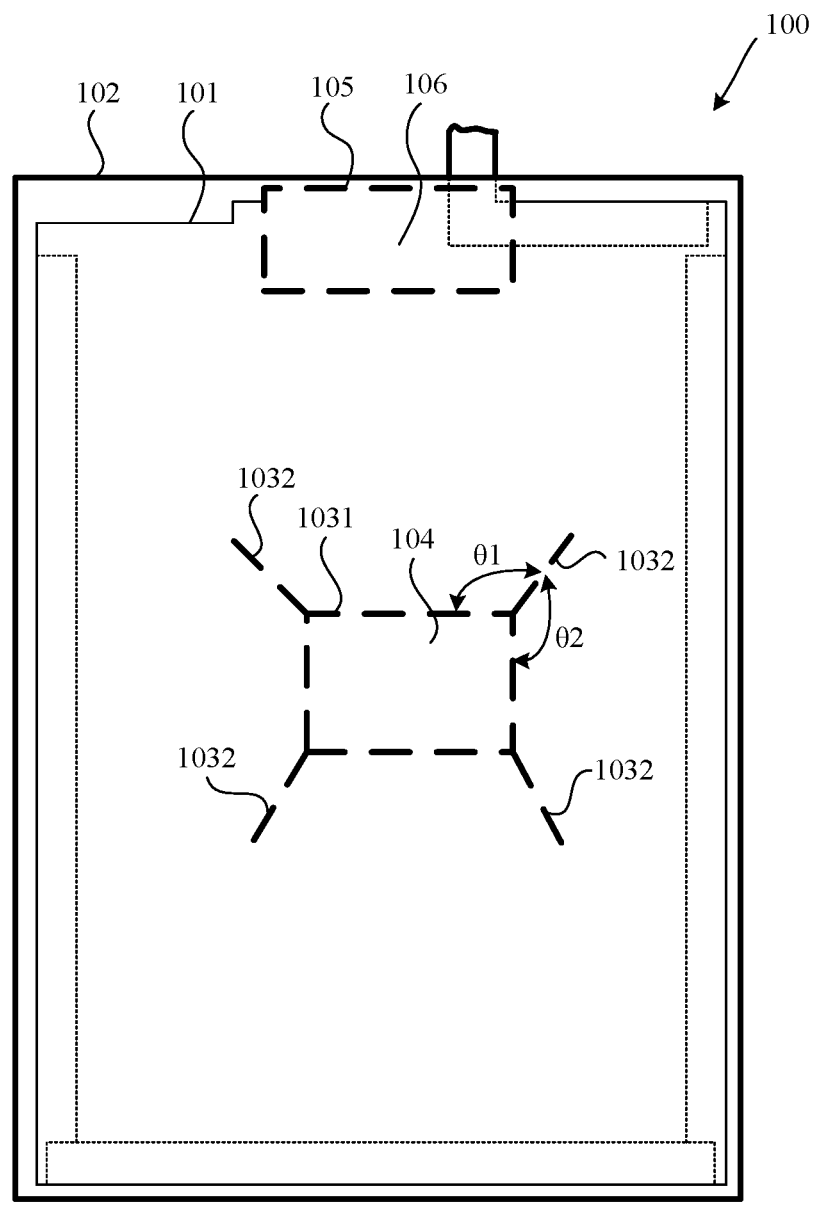
FIG. 5 is a second schematic structural diagram of a battery in a mobile terminal according to an embodiment of this application.

Optionally, referring to FIG. 5, a region enclosed by the first sub-tear line 1031 is rectangular. There are four second sub-tear lines 1032. The four second sub-tear lines 1032 respectively extend outward from four corners of the first sub-tear line 1031. Angles $\theta 1$ and $\theta 2$ between each second sub-tear line 1032 and two sides of the first sub-tear line 1031 that form each corner are both greater than 90°. In this way, after the first tear opening 104 is torn open along the first sub-tear line 1031, in the process of pulling the edge of the packaging film at the first tear opening 104 to move outward from the first tear opening 104, a pulling force may be concentrated at four corners of the first sub-tear line 1031, making it convenient to tear open the second surface 1022 of the package case 102 along the second sub-tear lines 1032, thereby reducing difficulty of tearing open the package case 102.

In the embodiment shown in FIG. 4, positive and negative electrodes for being connected to a control board in the mobile terminal may be disposed on a surface of the battery body 101. The battery supplies electrical power to the control board by using the positive and negative electrodes. The following two optional embodiments may be used to prevent the package case 102 from blocking the positive and negative electrodes of the battery body 101.

First optional embodiment: Referring to FIG. 4 and FIG. 5, a second tear line 105 is further disposed on the packaging film. The second tear line 105 forms a second tear opening 106. The second tear opening 106 is aligned with the positive and negative electrodes on the battery body 101. Therefore, before the positive and negative electrodes of the battery body 101 are connected to the control board in the mobile terminal, the second tear opening 106 can be torn open along the second tear line 105 to expose the positive and negative electrodes of the battery body 101, to facilitate a connection between the battery body 101 and the control board of the mobile terminal.

In the foregoing embodiment, the second tear opening 106 formed by the second tear line 105 may have a square shape, an oblong shape, a circular shape, an elliptical shape, or the like. This is not specifically limited herein. Moreover, the area of the second tear opening 106 is not specifically limited, provided that the positive and negative electrodes of the battery body 101 can be completely exposed by tearing open the second tear opening 106.

Figure 6:
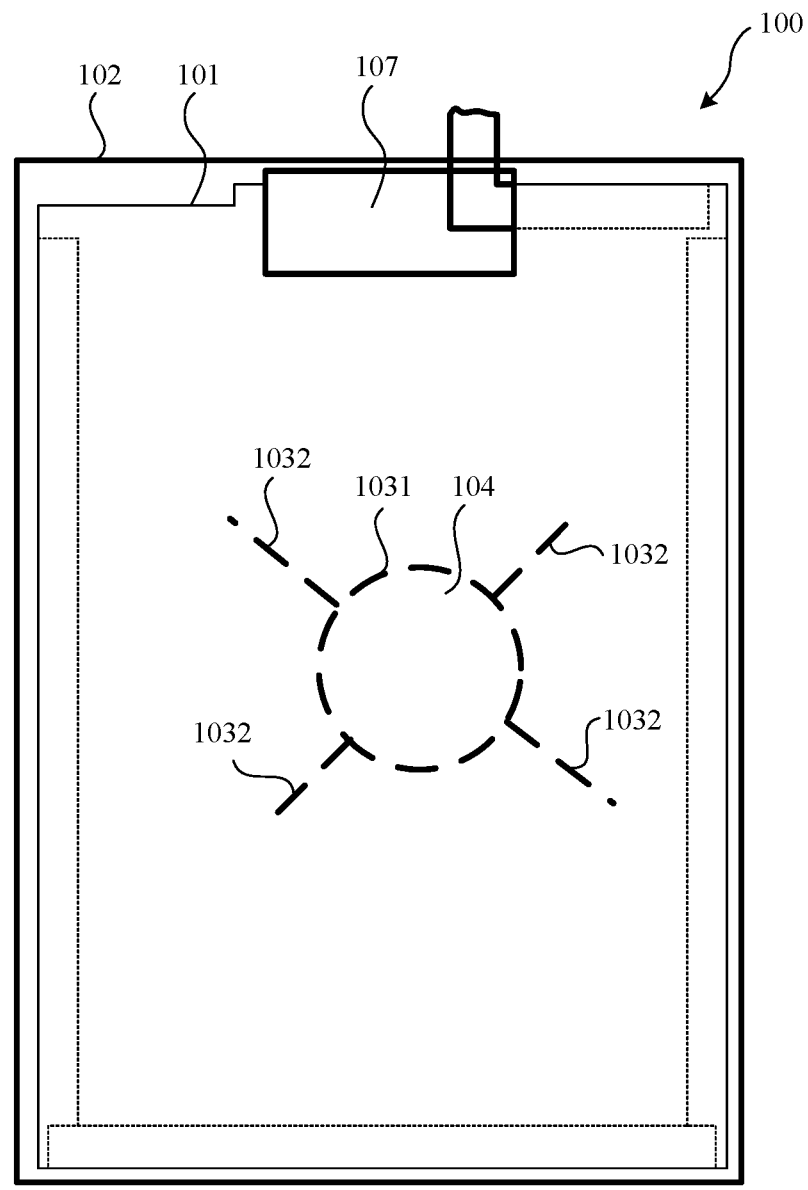
FIG. 6 is a third schematic structural diagram of a battery in a mobile terminal according to an embodiment of this application.

Second optional embodiment: Referring to FIG. 6, an opening 107 is disposed in a position, corresponding to the positive and negative electrodes of the battery body 101, of the package case 102. This opening 107 may be used to expose the positive and negative electrodes of the battery body 101, to facilitate a connection between the battery body 101 and the control board of the mobile terminal.

In the foregoing embodiment, the opening 107 may have a square shape, an oblong shape, a circular shape, an elliptical shape, or the like. This is not specifically limited herein. The area of the region of the opening 107 is not specifically limited, provided that the positive and negative electrodes of the battery body 101 can be completely exposed.

Optionally, a wall thickness of the package case 102 is less than 0.08 millimeter. This can prevent the wall thickness of the package case 102 from becoming relatively large to cause relatively large thickness of the battery, to facilitate implementation of a thin design of the battery, thereby further facilitating implementation of a thin design of the mobile terminal.

Optionally, the battery body 101 is packaged with the packaging film by using a plastic packaging apparatus. The plastic packaging apparatus is used to package an electromagnetic body with the packaging film, to implement an automated operation, thereby saving formation time of a plastic packaging case and improving formation efficiency.

Optionally, a temperature used to package the battery body 101 by using the plastic packaging apparatus is less than 80° C., to prevent the temperature used to package the battery body 101 to package the packaging film from exceeding a bearing limit of the battery body 101 to damage the battery body 101.

Optionally, a material of the packaging film is polyethylene. The polyethylene has better shrinkage performance during thermal plastic packaging, making it convenient to tightly attach the packaging film to a surface of the battery body 101.

In the descriptions of this specification, the specific features, structures, materials, or characteristics may be combined in a proper manner in any one or more of the embodiments or examples.

Other composition of the mobile terminal in the embodiments of the present invention is well known to persons skilled in the art, and details are not described herein.

It should finally be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A battery, securely bonded inside a rear housing of a mobile terminal, comprising:
   a battery body comprising:
      a positive electrode; and
      a negative electrode; and
   a package case configured to accommodate the battery body, wherein the package case comprises:
      a first surface configured to be attached and secured to the rear housing of the mobile terminal; and
      a second surface opposite to the first surface and comprising:
         a first opening comprising a tear structure, wherein the package case is configured to be torn open by tearing the tear structure to remove the battery body; and
         a second opening configured to pass the positive electrode and the negative electrode from the battery body through the package case to a control board of the mobile terminal.

2. The battery of claim 1, wherein the package case is a packaging film covering the battery body.

3. The battery of claim 2, wherein the tear structure is a first tear line, and wherein the second surface is configured to be torn open along the first tear line.

4. The battery of claim 3, wherein the first tear line is located in a central region of the second surface.

5. The battery of claim 3, wherein the first tear line comprises a first sub-tear line and a second sub-tear line, and wherein the first sub-tear line forms the first opening and extends outward from the first opening to form the second sub-tear line.

6. The battery of claim 5, wherein the package case further comprises a plurality of second sub-tear lines, and wherein the second sub-tear lines are disposed evenly around the first opening.

7. The battery of claim 5, wherein a region enclosed by the first sub-tear line is rectangular, wherein the package case further comprises four second sub-tear lines, wherein the four second sub-tear lines respectively extend outward from four corners of the first sub-tear line, and wherein angles between each second sub-tear line and two sides of the first sub-tear line that form each corner are greater than ninety degrees.

8. The battery of claim 2, wherein a second tear line is further disposed on the packaging film, wherein the second tear line forms the second opening, and wherein the second opening is aligned with the positive electrode and the negative electrode of the battery body.

9. The battery of claim 8, wherein the second opening is disposed in a position of the package case corresponding to the positive electrode and the negative electrode of the battery body.

10. The battery of claim 1, wherein a wall thickness of the package case is less than 0.08 millimeters.

11. The battery of claim 2, wherein the battery body is packaged with the packaging film using a plastic packaging apparatus.

12. The battery of claim 11, wherein an operating temperature used to package the battery body using the plastic packaging apparatus is less than eighty degrees Celsius (° C.).

13. The battery of claim 2, wherein a material of the packaging film is polyethylene.

14. The battery of claim 1, wherein the battery body is a reusable battery body.

15. The battery of claim 1, wherein the battery body is enclosed within an aluminum plastic film.

16. The battery of claim 1, wherein the package case comprises a rigid housing.

17. The battery of claim 1, wherein the package case comprises a flexible thin-film case.

18. The battery of claim 1, wherein the first opening and the second opening comprise a square shape, an oblong shape, or a circular shape.

19. The battery of claim 1, further comprising an adhesive configured to attach and secure the package case of the battery to the rear housing of the mobile terminal.

20. The battery of claim 1, further comprising stretch release tape configured to attach and secure the package case of the battery to the rear housing of the mobile terminal.

* * * * *